US012515433B2

(12) United States Patent
Cheich et al.

(10) Patent No.: US 12,515,433 B2
(45) Date of Patent: Jan. 6, 2026

(54) DUNNAGE CONVERSION SYSTEM AND METHOD FOR EXPANDING EXPANDABLE SHEET MATERIAL

(71) Applicant: Ranpak Corp., Concord Township, OH (US)

(72) Inventors: Robert C. Cheich, Independence, OH (US); Dennis J. Wagner, Painesville, OH (US)

(73) Assignee: Ranpak Corp., Concord Township, OH (US)

( * ) Notice: Subject to any disclaimer, the term of this patent is extended or adjusted under 35 U.S.C. 154(b) by 1196 days.

(21) Appl. No.: 16/639,257

(22) PCT Filed: Aug. 31, 2018

(86) PCT No.: PCT/US2018/048999

§ 371 (c)(1),
(2) Date: Feb. 14, 2020

(87) PCT Pub. No.: WO2019/046669

PCT Pub. Date: Mar. 7, 2019

(65) Prior Publication Data

US 2020/0247080 A1 Aug. 6, 2020

Related U.S. Application Data

(60) Provisional application No. 62/553,217, filed on Sep. 1, 2017.

(51) Int. Cl.

| | |
|---|---|
| ***B31D 5/00*** | (2017.01) |
| ***B65H 16/02*** | (2006.01) |
| ***B65H 16/10*** | (2006.01) |

(52) U.S. Cl.

CPC ......... *B31D 5/0065* (2013.01); *B31D 5/0047* (2013.01); *B65H 16/021* (2013.01);

(Continued)

(58) Field of Classification Search

CPC .......... B31D 5/0065; B31D 2205/0058; B31D 5/0047; B31D 5/23; B65H 16/106; B65H 2301/5124; B65H 2801/63

See application file for complete search history.

(56) References Cited

U.S. PATENT DOCUMENTS

| | | | | |
|---|---|---|---|---|
| 5,782,735 A * | 7/1998 | Goodrich | ............ | B31D 1/0031<br>83/175 |
| 6,440,268 B1 * | 8/2002 | Baggot | .................. | B65H 16/10<br>162/120 |

(Continued)

FOREIGN PATENT DOCUMENTS

| | | |
|---|---|---|
| EP | 0560102 | 9/1993 |
| KR | 20160050476 A | 5/2016 |

(Continued)

OTHER PUBLICATIONS

International Preliminary Report on Patentability issued Mar. 3, 2020 for PCT/US2018/048999.

(Continued)

*Primary Examiner* — Anne Marie Antonucci
*Assistant Examiner* — Luis G Del Valle
(74) *Attorney, Agent, or Firm* — Renner, Otto, Boisselle & Sklar, LLP

(57) ABSTRACT

A dunnage conversion assembly includes a supply of expandable sheet material and a dunnage conversion apparatus configured to expand the expandable sheet material. The apparatus includes a frame, a supply support mounted to the frame to support a supply of sheet material, and first and second expansion members rotatably mounted to the frame downstream of the supply support to receive the sheet material therebetween. At least one of the first expansion member or the second expansion member is rotatably driven. A drive assembly of the apparatus includes a drive member and a motive device that drives rotation of the drive (Continued)

member to dispense the sheet material from the supply. The drive member is movable between an operating position adjacent the supply support and a disengaged position spaced from the supply support. The drive member in the operating position is biased toward the supply support.

16 Claims, 9 Drawing Sheets

(52) U.S. Cl.

CPC ... *B65H 16/106* (2013.01); *B31D 2205/0023* (2013.01); *B31D 2205/0047* (2013.01); *B31D 2205/0058* (2013.01); *B65H 2301/5124* (2013.01); *B65H 2801/63* (2013.01)

(56) References Cited

U.S. PATENT DOCUMENTS

| | | | | |
|---|---|---|---|---|
| 6,520,080 | B1 * | 2/2003 | Fried | B65H 16/106 101/484 |
| 2003/0089816 | A1 * | 5/2003 | Hanson | B65H 19/1889 242/559 |
| 2003/0092552 | A1 * | 5/2003 | Armington | B31D 5/0047 493/464 |
| 2013/0105614 | A1 * | 5/2013 | Hjort | A47K 10/36 242/564.5 |
| 2016/0067938 | A1 * | 3/2016 | Goodrich | B26D 1/405 493/361 |
| 2019/0225445 | A1 * | 7/2019 | Lemmens | B65H 23/1955 |
| 2020/0247080 | A1 | 8/2020 | Cheich et al. | |

FOREIGN PATENT DOCUMENTS

| | | |
|---|---|---|
| WO | 2016/077728 | 5/2016 |
| WO | 2017/039792 | 3/2017 |
| WO | 2018/175742 | 9/2018 |
| WO | 2019046669 A1 | 3/2019 |

OTHER PUBLICATIONS

International Search Report and Written Opinion issued Dec. 11, 2018 for International Priority Application No. PCT/US2018/048999.

* cited by examiner

DUNNAGE CONVERSION SYSTEM AND METHOD FOR EXPANDING EXPANDABLE SHEET MATERIAL

RELATED APPLICATIONS

This application is a national phase of International Application No. PCT/US2018/048999, filed Aug. 31, 2018 and published in the English language, and which claims priority to U.S. Application No. 62/553,217 filed Sep. 1, 2017, both of which are hereby incorporated herein by reference in their entireties.

FIELD OF THE INVENTION

This invention relates generally to a dunnage conversion system and method for converting a sheet material into a dunnage product, and more particularly to a dunnage conversion system and method that automatically expands a pre-slit sheet material.

BACKGROUND

In the process of shipping one or more articles from one location to another, a packer typically places some type of packing material in a shipping container, such as a cardboard box, along with the article or articles to be shipped. The packing material, also referred to as dunnage, may be used to wrap the articles, or to partially or completely fill the empty space or void volume around the articles in the container. By filling the void volume, the packing material prevents or minimizes movement of the articles that might lead to damage during the shipment process. The packing material also can perform blocking, bracing, or cushioning functions. Some commonly used packing materials are plastic foam peanuts, plastic bubble pack, air bags, and converted paper packing material.

Unlike most plastic packing products, converted paper packing material is an ecologically-friendly packing material that is recyclable, biodegradable, and composed of a renewable resource. Expandable slit sheet paper packing material is useful as a cushioning material for wrapping articles and as a void-fill material for packing. The term expanding, as used herein, refers to a three-dimensional expansion, or a volume expansion. When the slit sheet paper is stretched in a direction transverse the direction of the slits, the paper deforms, increasing in length and thickness. This stretching and increase in thickness, and volume, more particularly, of the slit sheet paper packing material is referred to as expansion. The material expands in length and thickness while decreasing in width, which may yield about a twenty-fold increase in volume and comparable decrease in density. Slit sheet paper packing material, and an exemplary manufacturing thereof, are described in greater detail in U.S. Pat. Nos. 5,667,871 and 5,688,578, the disclosures of which are hereby incorporated herein by reference in their entireties.

SUMMARY OF THE INVENTION

While many dunnage conversion apparatuses produce an adequate dunnage product, existing dunnage conversion apparatuses and dunnage products are not ideal for all applications. The present invention provides a dunnage conversion apparatus that is compact, and easy to load and use. The dunnage conversion apparatus can be used with a pre-slit expandable sheet material to dispense an expanded dunnage product having both cushioning and void-fill characteristics, while occupying a reduced volume for transport and operation. The dunnage conversion apparatus is configured to drive expansion of the expandable sheet material and subsequent dispensing of an expanded dunnage or packing product. The speed of dispensing may be controlled via control of a motor of the dunnage conversion apparatus.

An exemplary dunnage conversion apparatus according to the present invention includes a frame and a supply support mounted to the frame to support a supply of sheet material. First and second expansion members are rotatably mounted to the frame downstream of the supply support to receive the sheet material therebetween and for rotation about respective first and second expansion axes, and at least one of the first expansion member or the second expansion member is driven for rotation about the respective expansion axis. A drive assembly includes a drive member and a motive device that drives rotation of the drive member about a drive member axis to dispense the sheet material from the supply. The drive member is movable between an operating position adjacent the supply support and a disengaged position spaced from the supply support. In the operating position, the drive member is biased toward the supply support.

The drive assembly may be configured such that drive member in the operating position is biased toward the supply support by gravity.

The drive assembly may include a handle for manually moving the drive member between the operating position and the disengaged position, and the handle may be weighted such that gravity acting on the handle biases the drive member toward the supply support.

The drive member may be pivotable between the operating position and the disengaged position.

The at least one of the first expansion member or the second expansion member may be driven at a faster speed than the drive member.

The first expansion member and the second expansion member both may be driven at the same speed and in opposite rotational directions about their respective first and second expansion axes.

The first and second expansion axes and the drive member axis may be aligned parallel to one another when the drive member is in the operating position.

The motive device may drive both of the drive member and the at least one of the first expansion member or the second expansion member.

The first and second expansion members each may include a plurality of recessed portions and outward portions alternatingly distributed along the respective first and second expansion axes between opposite axial ends of the first and second expansion members.

At least one of the first and second expansion members may be biased toward the other of the first and second expansion members via a biasing element.

The dunnage conversion apparatus may be in combination with a supply of sheet material including a sheet material having a plurality of slits configured to expand under tension applied in a feed direction from the supply support to the first and second expansion members.

The supply of sheet material in combination with the dunnage conversion apparatus may include the plurality of slits arranged in a plurality of transversely-extending, longitudinally-spaced rows.

The dunnage conversion apparatus further may include a second supply support for supporting a supply of separator sheet material, and the dunnage conversion apparatus may be in combination with a supply of separator sheet material supported on the second supply support.

The supply support may be removable from the frame when the drive member is in the disengaged position and the drive member in the operating position inhibits removal of the supply support.

The drive member in the operating position may be positioned to engage an axial end of the supply of sheet material.

Another exemplary dunnage conversion apparatus according to the present invention includes a frame and a supply support mounted to the frame for supporting a supply of sheet material. First and second expansion members are rotatably mounted to the frame downstream of the supply support to receive the sheet material therebetween and for rotation about respective first and second expansion axes. A drive assembly includes one or more motive devices. The drive assembly is configured to concurrently drive rotation of the supply about a longitudinal supply axis of the supply support and to drive rotation of both of the first and second expansion members about the respective first and second expansion axes.

The drive assembly may include a drive member driven about a drive member axis by the one or more motive devices, where the drive member may be movable between an operating position adjacent the supply support to drive rotation of the supply of sheet material and a disengaged position spaced from the supply support, and where the drive member in the operating position may be configured to inhibit removal of the supply support relative to the frame.

The drive member in the operating position may be biased toward the supply support.

An exemplary method of dispensing an expanded slit sheet material using the dunnage conversion apparatus in combination with the supply of expandable sheet material supported on the supply support and engageable by the drive assembly may be provided in accordance with the present invention. The method may include the steps of: (a) driving the sheet material with the drive assembly and the first and second expansion members in a feed direction from the supply support to the first and second expansion members, (b) expanding the expandable sheet material via tension between a dispensing force applied to the sheet material by the drive assembly and a gripping force applied to the sheet material by the first and second expansion members, (c) selectively engaging the supply of sheet material with the drive assembly such that engagement of the drive assembly with the supply of sheet material allows for dispensing of the sheet material from the supply, and disengagement of the drive assembly from the supply of sheet material allows for removal of the supply support from the frame, and (d) biasing the drive assembly toward the supply support when the drive assembly and the supply of sheet material are in engagement.

Another exemplary dunnage conversion apparatus according to the present invention includes a frame and a support means mounted to the frame and configured to support a supply of expandable sheet material. A driven dispensing means is mounted to the frame and configured to drive rotation of the supply of expandable sheet material to dispense the sheet material therefrom. The driven dispensing means further is configured to move between an operating position adjacent the support means and a disengaged position spaced from the support means, where the driven dispensing means in the operating position is biased toward the support means. A driven gripping means is mounted to the frame downstream of the support means and is configured to apply a gripping force to the sheet material as it is drawn from the supply via the driven dispensing means. The driven gripping means and the driven dispensing means are configured to cooperate to provide expansion of the sheet material as the sheet material is tensioned between the driven gripping means and the driven dispensing means.

The foregoing and other features of the invention are hereinafter fully described and particularly pointed out in the claims, the following description and annexed drawings setting forth in detail certain illustrative embodiments of the invention, these embodiments being indicative, however, of but a few of the various ways in which the principles of the invention may be employed.

BRIEF DESCRIPTION OF THE DRAWINGS

The annexed drawings, which are not necessarily to scale, are provided to illustrate various aspects of the disclosure.

DETAILED DESCRIPTION

The present invention provides a dunnage conversion system for automatically or manually producing an expanded slit sheet packing material from a supply of unexpanded slit sheet material from a compact, easily resuppliable apparatus. The unexpanded slit sheet material also may be referred to as sheet material or slit sheet material, for example. The dunnage conversion system facilitates rapid production of an expanded packing product, also referred to as an expanded dunnage product, improving yield and performance. Further, the dunnage conversion system is compact, with a relatively small footprint and occupying a relatively small volume, thus facilitating ease in transport and storage of the system. A dunnage conversion apparatus of the dunnage conversion system also is easy to load with a supply of the unexpanded sheet material.

Figure 1:
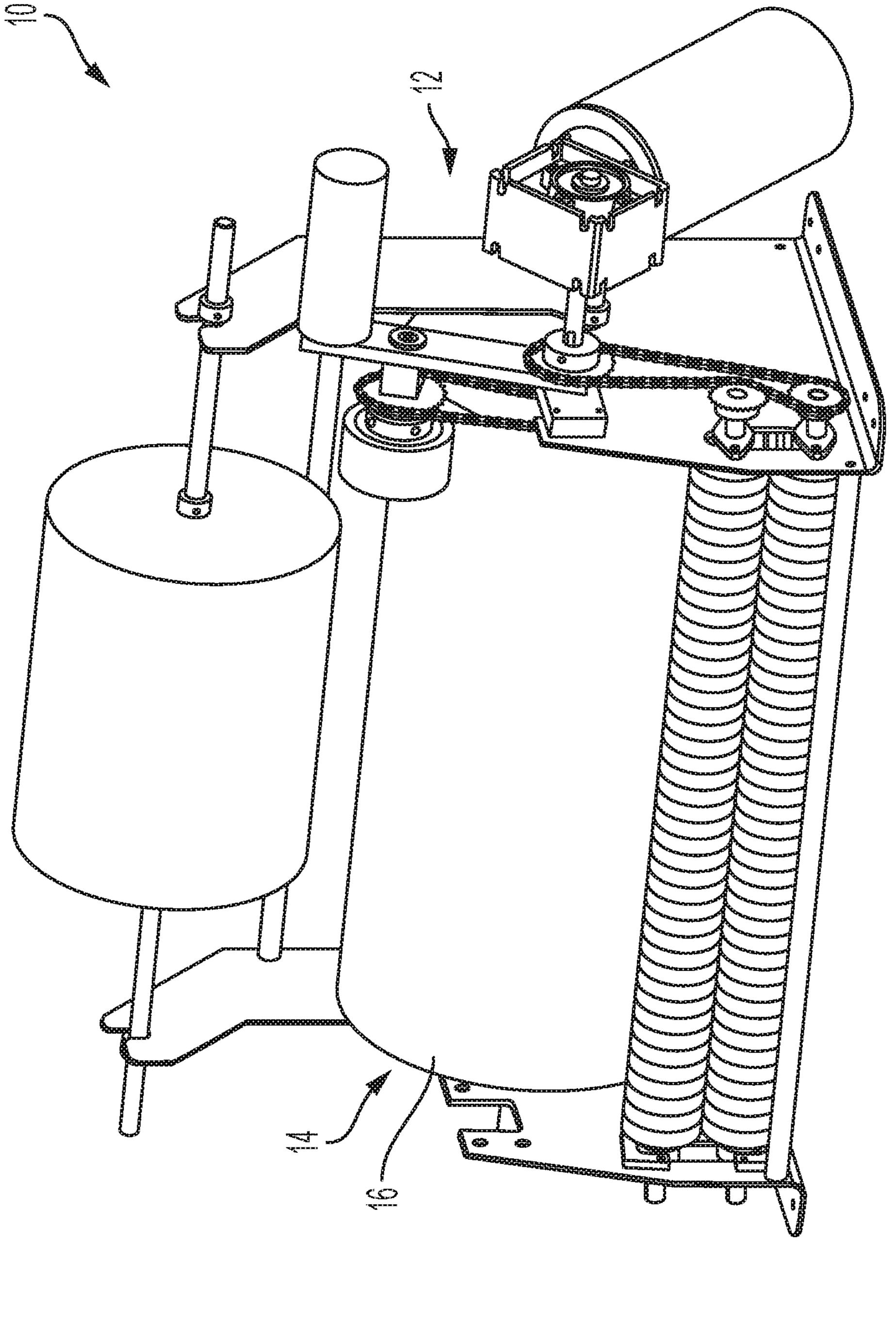
FIG. 1 is a front orthogonal view of an exemplary dunnage conversion system provided in accordance with the present invention including both a dunnage conversion apparatus and supplies of sheet material.

Referring initially to FIG. 1, aspects of an exemplary dunnage conversion system 10 are illustrated and include a dunnage conversion apparatus 12 and a supply 14 of unexpanded sheet material 16. The conversion apparatus 12, also herein referred to as an apparatus, an expanding apparatus, a dunnage expanding apparatus, a conversion machine, or a converter, enables an operator to produce an expanded dunnage product 18 (FIG. 2) from the supply 14.

The supply 14 of the sheet material 16 is supplied in one or more rolls. The depicted sheet material 16 in each roll is wound about a hollow core that may be received on a respective supply support of the dunnage conversion apparatus 12. The hollow core may rotate about the supply support or with the supply support as the sheet material 16 is unwound off the roll. The hollow core may be omitted in some embodiments.

The supply 14 includes sheet material 16 that has been slit and typically includes one or more plies. An exemplary sheet material 16 is paper, such as kraft paper, and more particularly, is a single-ply kraft paper. Suitable kraft paper may have various basis weights, such as twenty-pound or forty-pound, for example. In some embodiments, the sheet material 16 may be laminated or may include any other suitable material such as another paper, plastic sheets, metal foil, or any combination thereof.

Figure 2:
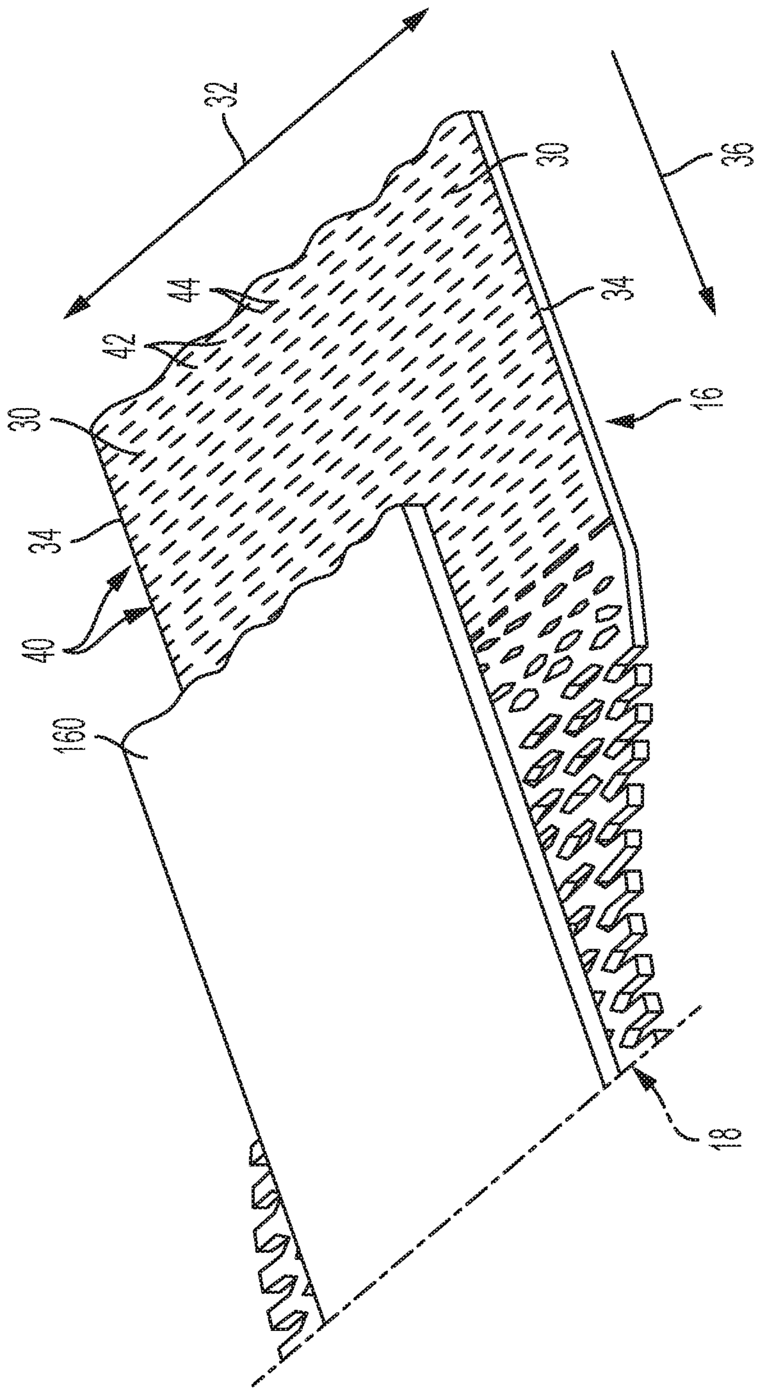
FIG. 2 is a schematic representation of a slit sheet material provided by the invention, illustrating the expansion of the sheet to an expanded dunnage product.

Turning next to FIG. 2, the exemplary sheet material 16 is shown in detail. The sheet material 16 has a plurality of slits 30 that are cut through the sheet material 16 and extend in a lateral direction across a width dimension 32 of the sheet material 16 between opposite lateral edges 34, generally parallel to an axis of the roll. The lateral direction is transverse a longitudinal feed direction 36 of the sheet material 16 through the apparatus 12. The slits 30 may be formed by cutting the sheet material 16, or by otherwise weakening the sheet material 16 intermittently across the sheet material 16. In this way, the sheet material 16 separates at each of the slits 30 under longitudinal tension provided in the feed direction 36, also referred to as the direction of advancement or the longitudinal direction.

Typically, the slits 30 are provided in rows 40, such as longitudinally-spaced, transversely-extending lateral rows 40, that are generally parallel to one another and are generally periodically, and typically equally, spaced from one another. The slits 30 are intermittently dispersed across the rows 40, with the slits 30 of each row 40 generally being staggered in relation to slits 30 of directly adjacent rows 40. Across each row 40 of slits 30, there may be a greater length of combined slits 30 than a length of un-slit portions 42 disposed between slit endpoints 44. The apparatus 12 provided by the invention also may be used with a supply 14 of sheet material 16 with a different arrangement of slits 30.

This exemplary slit sheet material 16 is configured to expand in one or more dimensions, also herein referred to as volume expansion or volumetric expansion. When the sheet material 16 is stretched in a direction transverse the direction of the slits 30, typically in the longitudinal feed direction 36, perpendicular to the width dimension 32 of the roll of sheet material 16, the sheet material's longitudinal length dimension and its thickness dimension increase, while the sheet material's lateral width dimension 32 decreases.

The thickness dimension extends in a normal direction relative to the plane of the unexpanded sheet material 16, or relative to a face of the sheet material 16. The normal direction is defined as generally orthogonal to the sheet material's longitudinal length and also generally orthogonal to a lateral extent of the sheet material 16 extending along the width dimension 32 between the lateral edges 34.

The increased thickness as the sheet material 16 is stretched longitudinally is caused by sheet material 16 adjacent an upstream side of slits 30 separating from the sheet material 16 adjacent a downstream side of the slits 30. Further, the un-slit portions 42 of the sheet material 16 between the rows 40 of slits 30 rotate relative to a plane of the unexpanded sheet material 16. The increase in thickness is a function of the longitudinal spacing between the rows of slits. Upon the volumetric expansion of the sheet material 16, the thickness of the sheet material 16 can increase by an order of magnitude or more relative to its original thickness when stretched in this manner.

In summary, the expanded slit sheet material, or dunnage product 18, has an increased length and thickness and reduced width as compared to the unexpanded slit sheet material 16. The increased volume and reduced density allows the expanded dunnage product 18 to serve as a perforate protective void-fill or cushioning wrap for packaging articles in containers.

Figure 3:
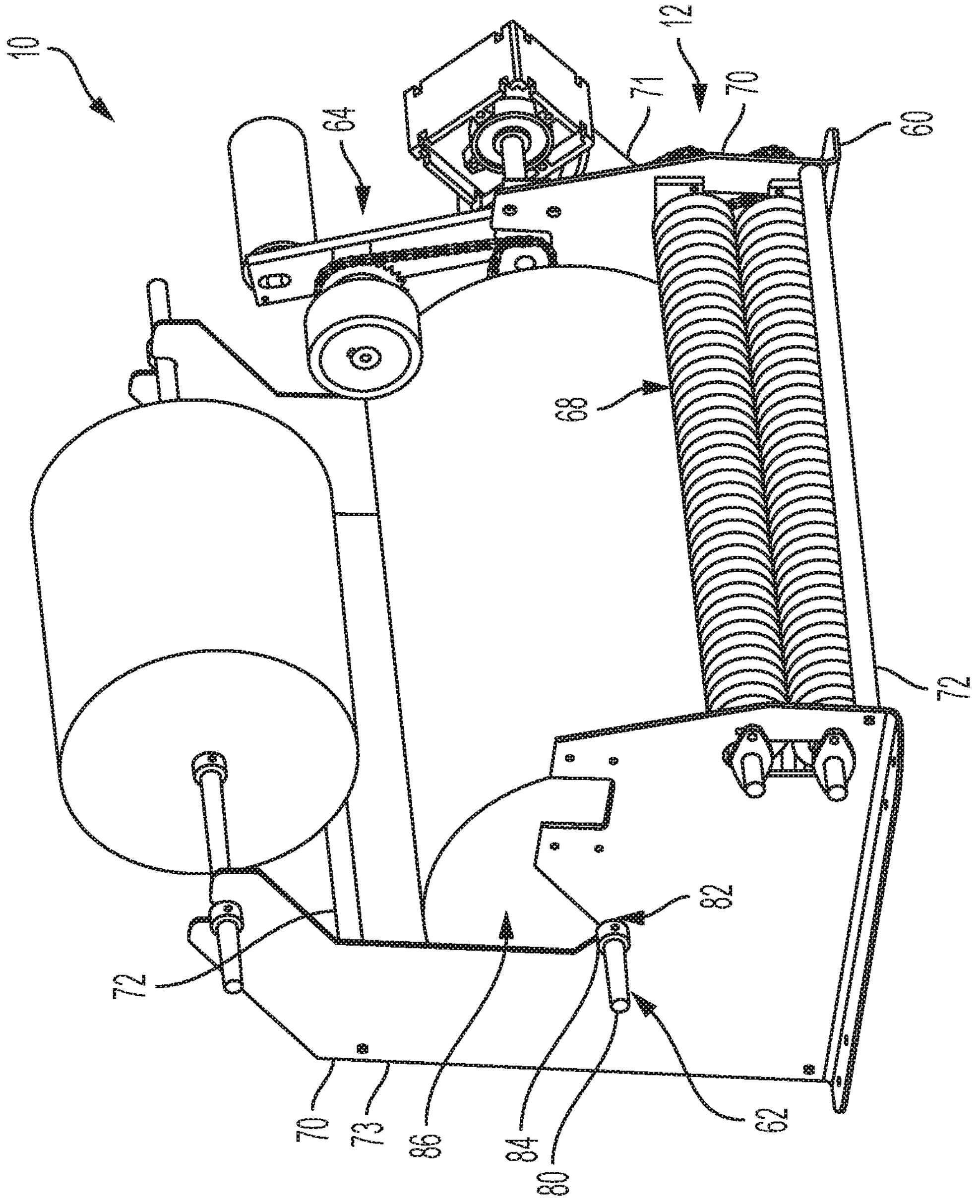
FIG. 3 is a front orthogonal view of the exemplary dunnage conversion system of FIG. 1, shown from an opposite side of the system as shown in FIG. 1.
Figure 4:
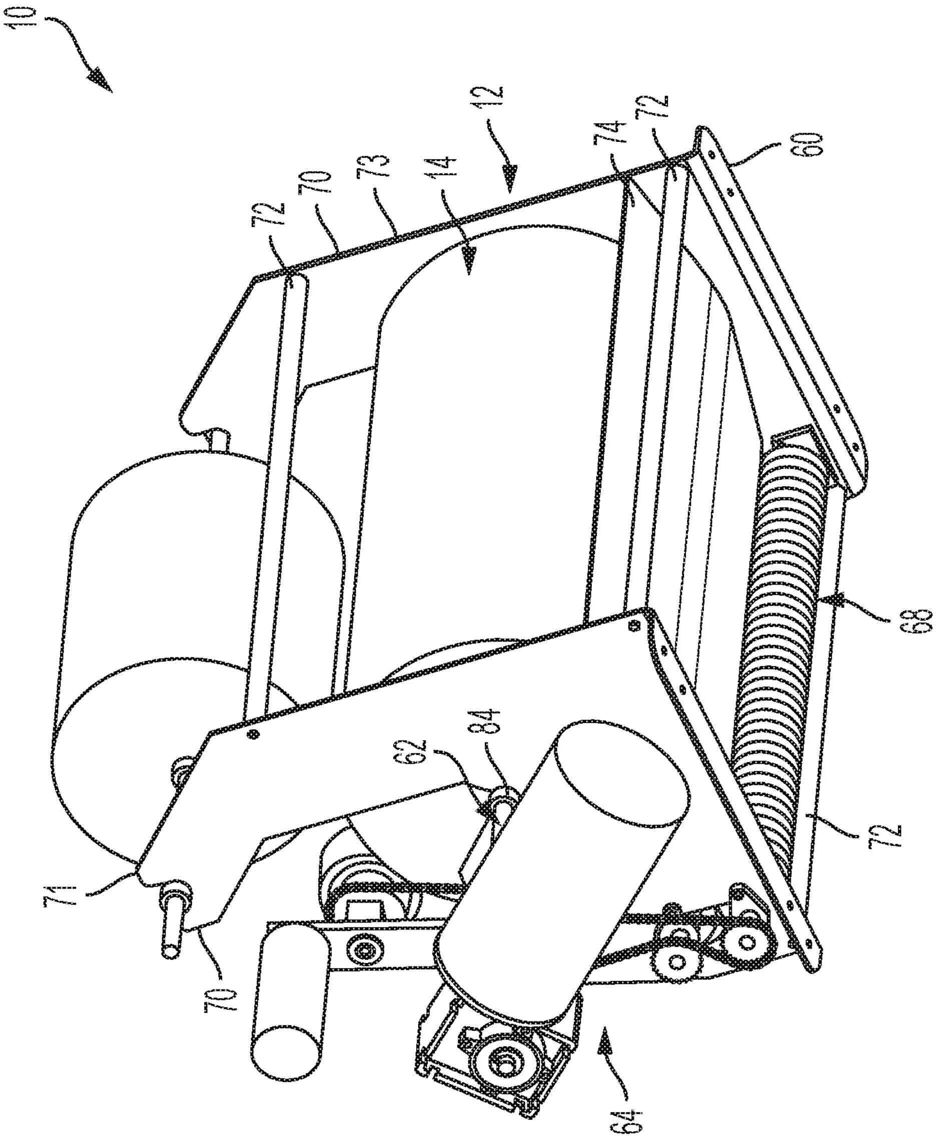
FIG. 4 is a rear orthogonal view of the exemplary dunnage conversion system of FIG. 1.
Figure 5:
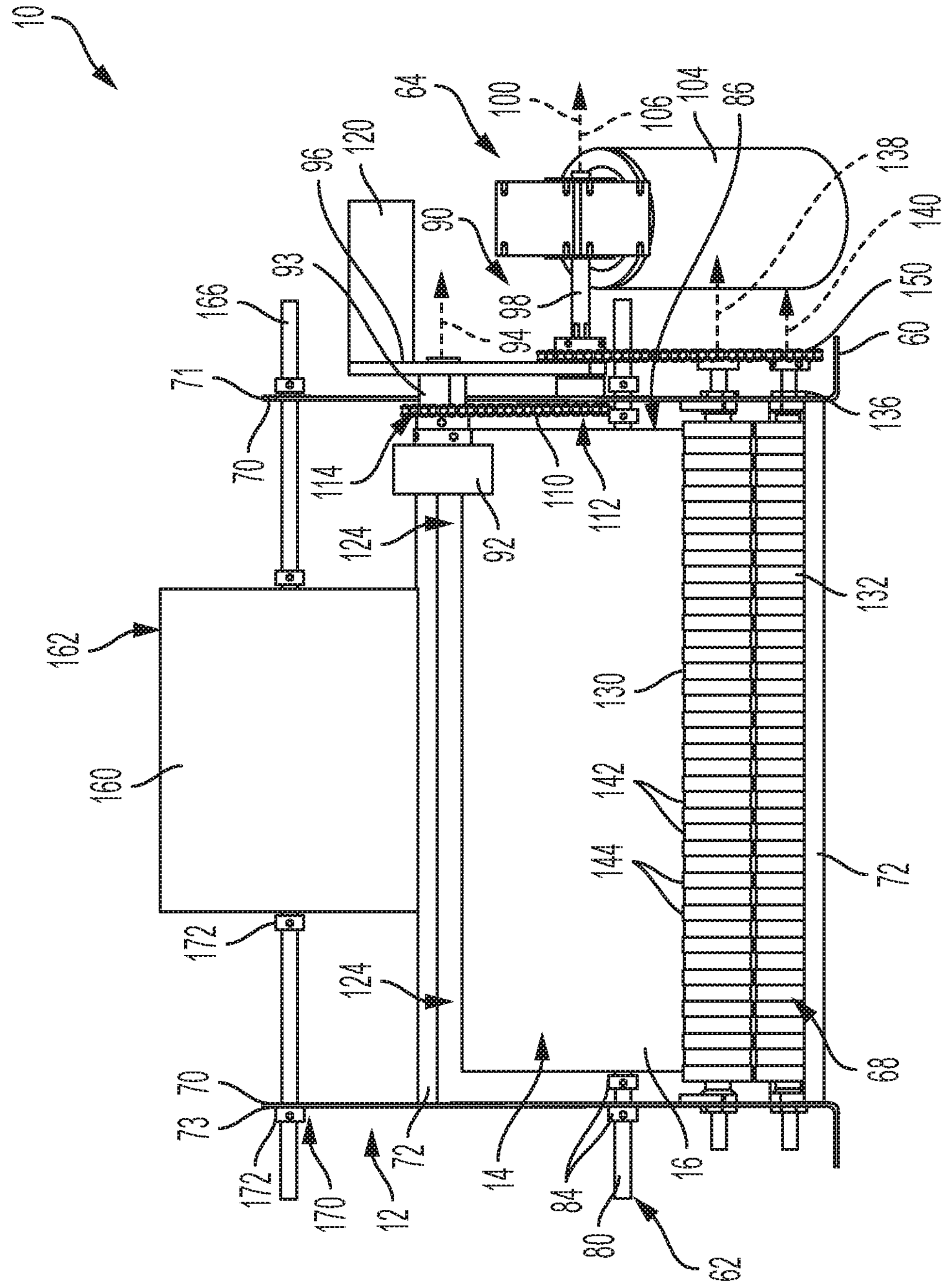
FIG. 5 is a front elevation view of the exemplary dunnage conversion system of FIG. 1.

Turning now to FIGS. 3 to 5, the dunnage conversion apparatus 12 for expanding the sheet material 16 includes a frame 60, a supporting means 62, a dispensing means 64, and a gripping means 68.

The depicted frame 60 includes opposite lateral sides 70, including a right lateral side 71 opposite a left lateral side 73. The sides 70 are supported relative to one another by one or more laterally-extending frame members 72. As shown, three frame members 72 extend between and are suitably coupled to the lateral sides 70. A bottom portion 74 (FIG. 4) also extends between and is suitably coupled to the lateral sides 70. The bottom portion 74 is disposed at a lower region of the apparatus 12, and is generally below the supply 14. The bottom portion 74 may assist in guiding the sheet material 16 from the supply 14 toward an output location of the apparatus 12 adjacent the gripping means 68. The bottom portion 74 also may separate the supply 14 from a work surface, such as a table. The lateral sides 70 of the frame 60 may be mounted to such a work surface by any suitable means, such as screws, bolts, or other fasteners.

The supporting means 64 is configured to support the supply 14. To do so, the supporting means 64 includes a supply support 80 mounted to the frame 60 to support the supply 14 of sheet material 16. The illustrated supply support 80 serves as an axle about which the hollow core of the supply 14 is received. The supply support 80 is received in opposing notches 82 defined by the opposing lateral sides 70. Alignment collars 84 may be disposed on the supply support 80 to aid in lateral alignment of the supply 14 along the supply support 80 and also of the supply 14 between the lateral sides 70. For example, a pair of alignment collars 84 is spaced between axial end faces 86 of the illustrated supply and the lateral sides 70, while another pair of alignment collars 84 is spaced outwardly of the lateral sides 70 (not inwardly between the lateral sides 70).

The supporting means is not limited to the illustrated axle, however. In other embodiments, the supporting means 64 may include a pair of protrusions extending inwardly from the respective sides 70 onto which the supply 14 may be set, such as where the hollow core or the roll of sheet material 16 is received on the protrusions.

Figure 6:
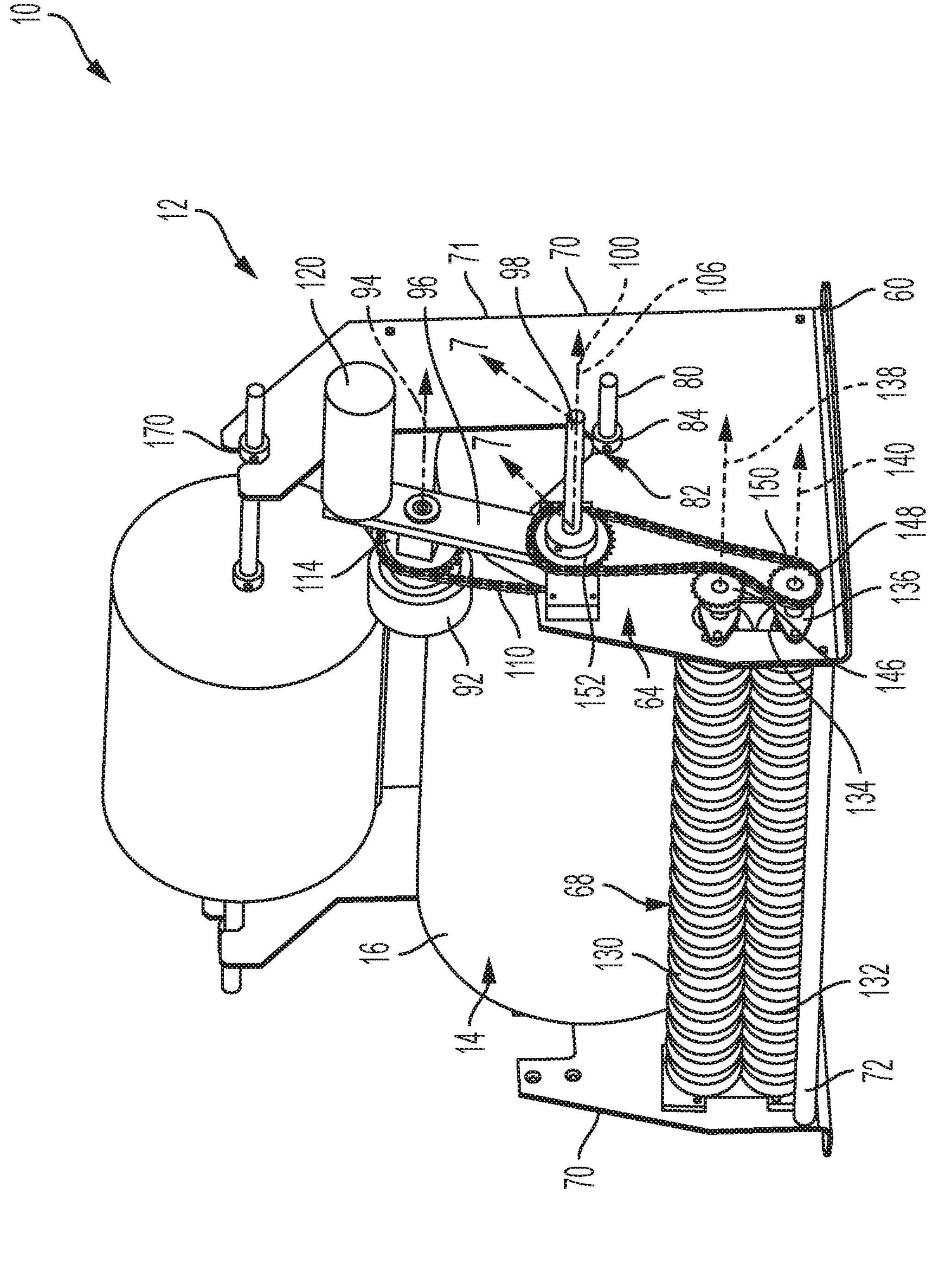
FIG. 6 is a right side orthogonal view of the exemplary dunnage conversion system shown in FIG. 1 showing the drive assembly absent the drive motor.
Figure 7:
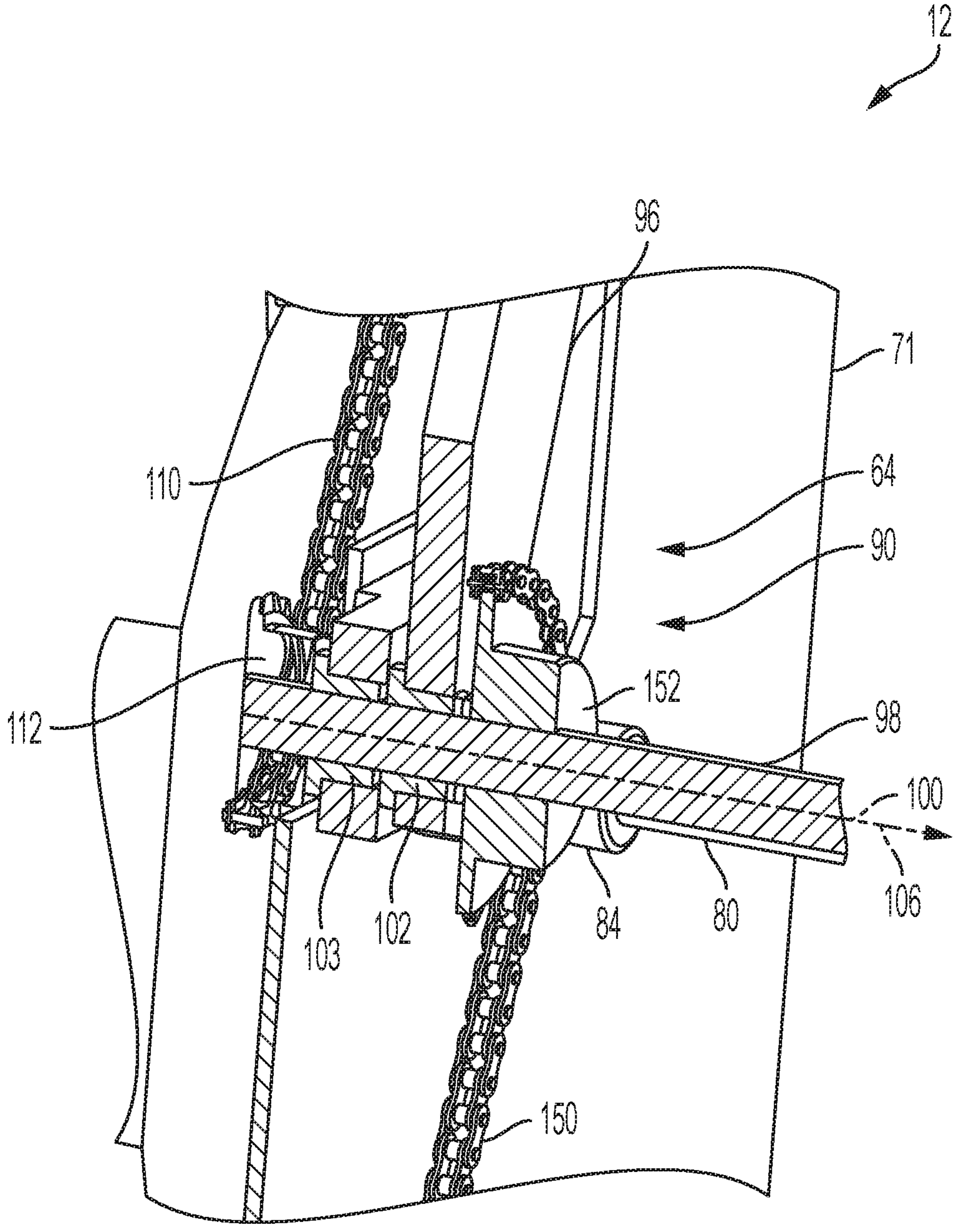
FIG. 7 is a cross-sectional view of a portion of a drive assembly of the exemplary dunnage conversion system of FIG. 6, shown through line 7-7 of FIG. 6.

Looking next to FIGS. 5 to 7, the dispensing means 64 is configured to drive rotation of the supply 14 to dispense the sheet material 16 from the supply 14. The depicted dispensing means 64 includes a drive assembly 90 having a drive member 92 that is rotatable about a drive member axis 94. The depicted drive member 92 is a cylindrical roller that is fixedly coupled to and received on a drive member shaft 93 for rotation with the drive member shaft 93 about the drive member axis 94. The drive member shaft 93 is rotatably coupled to a pivot arm 96, such that the drive member 92 may rotate relative to the pivot arm 96. The drive member shaft 93 and drive member 92 may be unitary in other embodiments.

The pivot arm 96 is coupled to one of the lateral sides 70, such as the depicted right lateral side 71, and pivots about a pivot axis 100 that extends through the pivot arm 96. The pivot axis 100 is spaced from and generally parallel to the drive member axis 94. As a result, the drive member 92 and drive member shaft 93 are pivotably movable with the pivot arm 96 about the pivot axis 100 relative to the respective lateral side 70 of the frame 60.

A support shaft, such as drive shaft 98, is mounted to the lateral side 71, to which the pivot arm 96 is coupled. The drive shaft 98 both supports the pivot arm 96 for pivoting movement of the pivot arm 96 relative to the lateral side 71, and also is the drive shaft for transferring a drive force through the drive assembly 90 to the drive member 92.

The pivot arm 96 is received on and supported by the drive shaft 98. As shown in FIG. 5, a bearing or bushing 102 may be circumferentially disposed between the drive shaft 98 and the pivot arm 96. Another bearing or bushing 103 may be circumferentially disposed between the drive shaft 98 and the right lateral side 71. In this way, the pivot arm 96 is not fixed to the drive shaft 98 but is free to rotate independently, and thus the drive shaft 98 is rotatable separate from pivoting of the pivot arm 96.

To drive the rotation of the drive shaft 98, a proximal end of the drive shaft 98 is coupled to a motive device of the drive assembly 90, such as a drive motor 104. The drive motor 104 may be any suitable motor such as an electro-mechanical motor. The drive motor 104 may be coupled to the frame 60 by any suitable means (not shown) for being supported by the frame 60, or may be supported separate from the frame 60. The drive motor 104 drives rotation of the drive shaft 98 about a drive shaft axis 106 that is colinear with the pivot axis 100.

Via the drive shaft 98, the drive motor 104 is configured to drive rotation of the drive member 92. In the illustrated drive assembly 90, a transfer member 110, such as a belt or a drive chain, extends between the drive shaft 98 and the drive member shaft 93. The depicted transfer member 110 is a drive chain, and each of the drive shaft 98 and the drive member shaft 93 include a respective toothed gear mounted thereto for cooperating with the drive chain to drive rotation of the drive member 92. Specifically, a first gear 112 is fixedly coupled to the distal end of the drive shaft 98, inwardly of the right lateral side 71. A second gear 114 is fixedly coupled to the drive member shaft 93. The depicted transfer member 110 extends about each of the first and second toothed gears 112, 114, and thus about each of the drive shaft 98 and the drive member shaft 93, providing for transfer of rotational force from the drive motor 104 and drive shaft 98 to the drive member 92. The drive motor 104 remains fixed relative to the moving and pivoting drive member 98, facilitating pivoting movement of the drive member 92.

The drive assembly 90 is configured, such as via the pivot arm 96, so that the drive member 92 may move between an operating position adjacent the supply support 80 and a disengaged position spaced from the supply support 80. A handle 120 is coupled to a distal end of the pivot arm 96, opposite the proximal end of the pivot arm 96 that is received on the drive shaft 98. The handle 120 allows for manual movement of the drive member 92 about the pivot axis 100 between its operating position and its disengaged position.

The depicted handle 120 also is weighted, such that gravity acting on the handle 120 biases the drive member 92 toward the supply support 80 when the drive member 92 is in the operating position. Biasing the drive member 92 enables the drive member 92 to continually remain in contact with the supply 14. As the sheet material 16 is dispensed from the supply 14 and the circumference of the respective roll of sheet material 16 in the supply 14 decreases, the drive member 92 continues to be biased toward the supply support 80 and into contact with the supply 14.

In the illustrated operating position, the drive member 92 is positioned to engage an axial end 124 of the stock roll/supply 14, adjacent the right lateral side 71. The right axial end 124 includes the right axial end face 86 of the supply 14. In other embodiments, the drive member 92 may be otherwise spaced along the drive member shaft 93, may have a wider or narrower surface of contact with the supply 14 than depicted, or a combination thereof.

As can be seen in FIGS. 5 and 6, the drive member 92 in the operating position inhibits removal of the supply support 80 from the notches 82 of the frame 60. The supply support 80 may only be removed from the front of the apparatus 12 when the drive member 92 and pivot arm 96 are pivoted in a direction outwardly, away from the supply support 80, such that the drive member 92 is in the disengaged position. The drive member 92 may come to rest against the gripping means 68 or a work surface on which the frame 60 is supported, for example, in the disengaged position. In this disengaged position of the drive member 92, the supply support 80 may be easily removed from the notches 82 of the frame 60. Also, with the drive member 92 in the disengaged position, the supply 14 cannot be driven for rotation by the drive member 92, since the drive member 92 will be spaced from the supply 14 and from the supply support 80.

Figure 8:
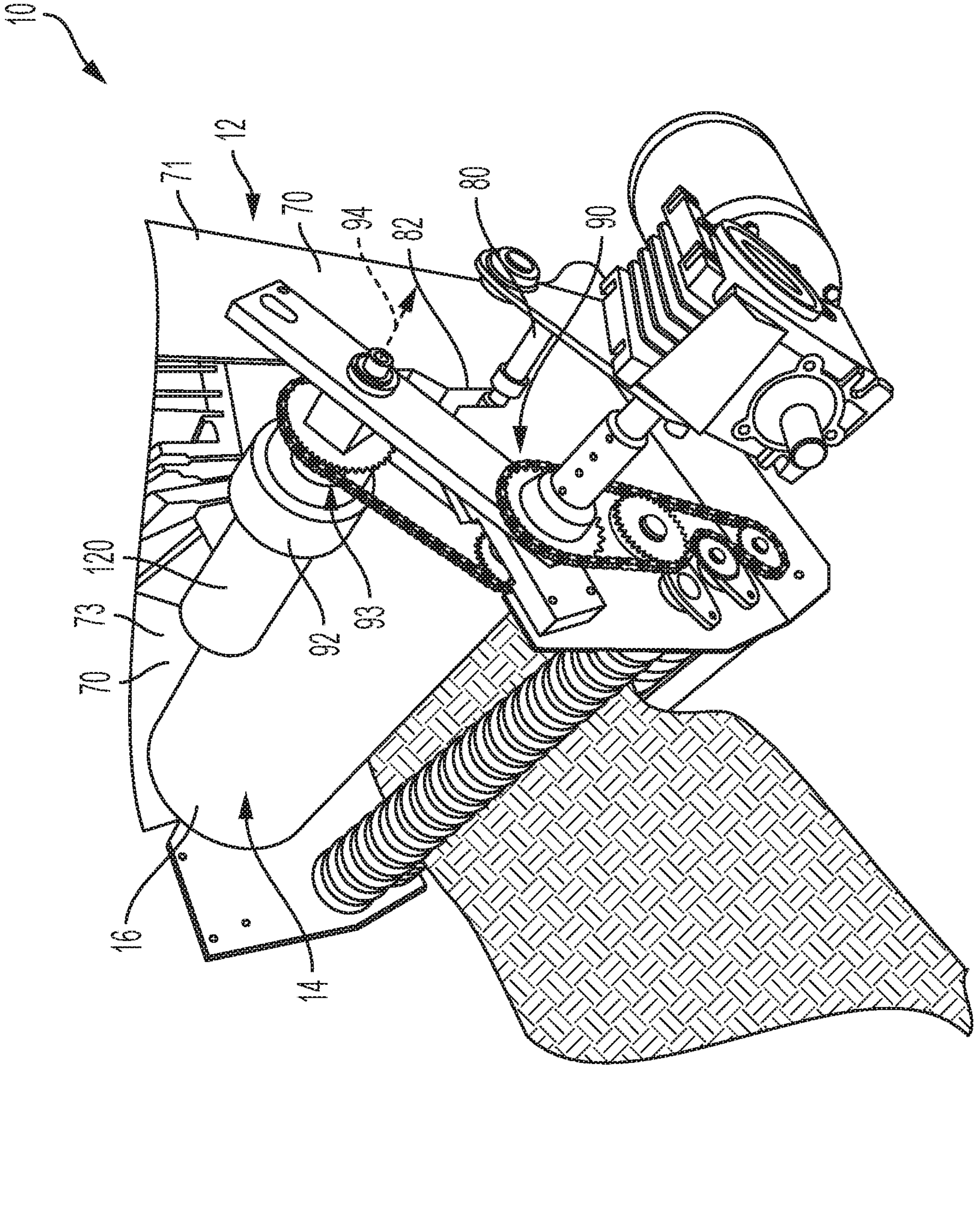
FIG. 8 is a front orthogonal view of the exemplary dunnage conversion system shown in FIG. 1, showing the expandable sheet material being expanded and output from the system, and also showing the weighted handle moved to a position different from that shown in FIG. 1.

In alternative embodiments, (a) the drive member 92 may be otherwise biased toward the supply support 80, such as by a spring or other resilient member, (b) the handle 120 may be omitted, (c) the drive assembly 90 may be otherwise weighted or a combination thereof. Additionally or alternatively, the biasing weight may be otherwise suitably positioned relative to the drive member 92. For example, as shown in FIG. 8, the handle 120 may be coupled to the drive member shaft 93 inwardly between the lateral sides 70 and along the drive member axis 94.

Looking again to FIGS. 5 and 6, and now to the gripping means 68, the sheet material 16 is further aided in its dispensing via the gripping means 68. The gripping means 68 cooperates with the dispensing means 64 to expand the sheet material 16 during its dispensing from the apparatus 12. The illustrated gripping means 68 has a pair of expansion members including an upper, first expansion member 130 and a lower, second expansion member 132. The expansion members 130, 132 are rotatably mounted to the frame 60 at a location spaced downstream of the supply support 80 to receive the sheet material 16 therebetween. The expansion members 130, 132 are received in opposing slots 134 of the lateral sides 70 and are spaced apart in the slots 134 via spacing members 136 that are coupled to the lateral sides 70. The illustrated spacing of the expansion members 130, 132 from one another is fixed, though in other embodiments, at least one of the expansion members 130, 132 may be biased toward the other of the expansion members 130, 132.

The expansion members 130, 132 are configured to apply a consistent gripping force to the sheet material 16 as it is drawn from the supply 14 via the drive assembly 90. The expansion members 130, 132 are rotatable about respective parallel expansion axes 138, 140, and the expansion axes 138, 140 also are aligned parallel to and spaced from the drive member axis 94.

The illustrated expansion members 130, 132 each include a plurality of recessed portions 142 and outward portions 144, alternatingly distributed along the respective first and second expansion axes 138, 140 between opposite axial ends of the first and second expansion members 130, 132. The recessed portions 142 and outward portions 144 of respective expansion members 130, 132 are aligned with corresponding recessed portions 142 and outward portions 144 of the opposing expansion member 130 or 132. The recessed portions 142 and outward portions 144 may aid in gripping the sheet material 16 and in providing consistent gripping and uniform expansion of the sheet material 16 across the lateral width 32 of the sheet material 16. As used herein, uniform expansion refers to generally equivalent expansion at various point along the lateral width 32 of the expanded sheet material 16. Other means for gripping the sheet material 16 may be provided in other embodiments.

At least one of the expansion members 130, 132, and as illustrated, each of the expansion members 130, 132, is driven for rotation about the respective expansion axes 138, 140. The expansion members 130, 132 also are intercoupled with the drive member 92 to be jointly driven by the drive motor 104. To aid in the driving of the first expansion member 130, a toothed gear 146 is fixedly coupled to a right axial end of the expansion member 130, outwardly of the right lateral side 71 of the frame 60. To aid in the driving of the second expansion member 132, a toothed gear 148 is fixedly coupled to a right axial end of the expansion member 132, outwardly of the right lateral side 71 of the frame 60.

A transfer member, such as a drive chain 150, interconnects each of the toothed gears 146, 148, and a toothed gear 152 disposed about and fixed to the drive shaft 98 outwardly of the right lateral side 71. Particularly, an inner perimeter of the drive chain 150 is disposed circumferentially about the lower expansion axis 140 and an outer perimeter of the drive chain 150 abuts the upper toothed gear 146. In this way, the expansion members 130, 132 can be driven in opposite rotational directions about the respective expansion axes 138, 140.

Via the interconnecting toothed gears 112, 114, 146, 148, 152 and transfer members 110, 150, the drive motor 104 drives rotation of each of the drive member 92 and both of the expansion members 130, 132. Further, the drive assembly 90 is configured to drive each of the expansion members 130, 132 at the same speed, and also at a faster speed than the drive member 92 is driven. The driving of the expansion members 130, 132 at a faster speed than the drive member 92 causes tensioning of the sheet material 16 between the supply support 80 and the expansion members 130, 132, facilitating expansion of the sheet material 16 therebetween. The tensioning and differing speeds are generated by the gear ratio between the driving gear 152 and the driven gears 146, 148, and likewise between the driving gear 112 and the driven gear 114.

FIG. 6 in particular, further illustrates the joint driving of the drive member 92 and expansion members 130, 132. The respective rotation directions are mentioned with respect to the view of FIG. 6 showing the right side of the apparatus 12. For example, where the drive shaft 98 and driving toothed gear 112 are driven in a counter-clockwise direction, the drive chain 110 and drive member 92 also are driven in a counter-clockwise direction. This drives the supply 14 in a clockwise direction, causing the sheet material 16 to be dispensed under the roll of the supply 14. The drive chain 150 and the driven gear 152 also are driven in a counter-clockwise direction. Due to the interweaving of the drive chain 150 with the upper gear 146 and the lower gear 148, the upper expansion member 130 is driven in a clockwise direction and the lower expansion member 132 is driven in a counter-clockwise direction. The opposite rotation of the expansion members 130, 132 facilitates a consistent and generally equal gripping force to be applied to each of the top and bottom of the sheet material 16 being drawn and gripped therebetween.

Turning again to the drive assembly 90 in general, the drive assembly 90 also may be otherwise suitably constructed to expand the sheet material 16 and dispense it from the apparatus 12. In alternative embodiments, the drive assembly 90 may include any one or more of the following: (a) one or both of the transfer members 110, 150 may be a band or cord that may be received about pulley wheels, for example, in place of respective of the toothed gears 112, 114, 146, 148; (b) additional gears or transfer members may be used to drive the drive member 92 or the expansion members 130, 132; (c) a separate motive device may drive one or more of the drive member 92, the upper expansion member 130, or the lower expansion member 132; and (d) only one of the expansion members 130, 132 may be driven.

Figure 9:
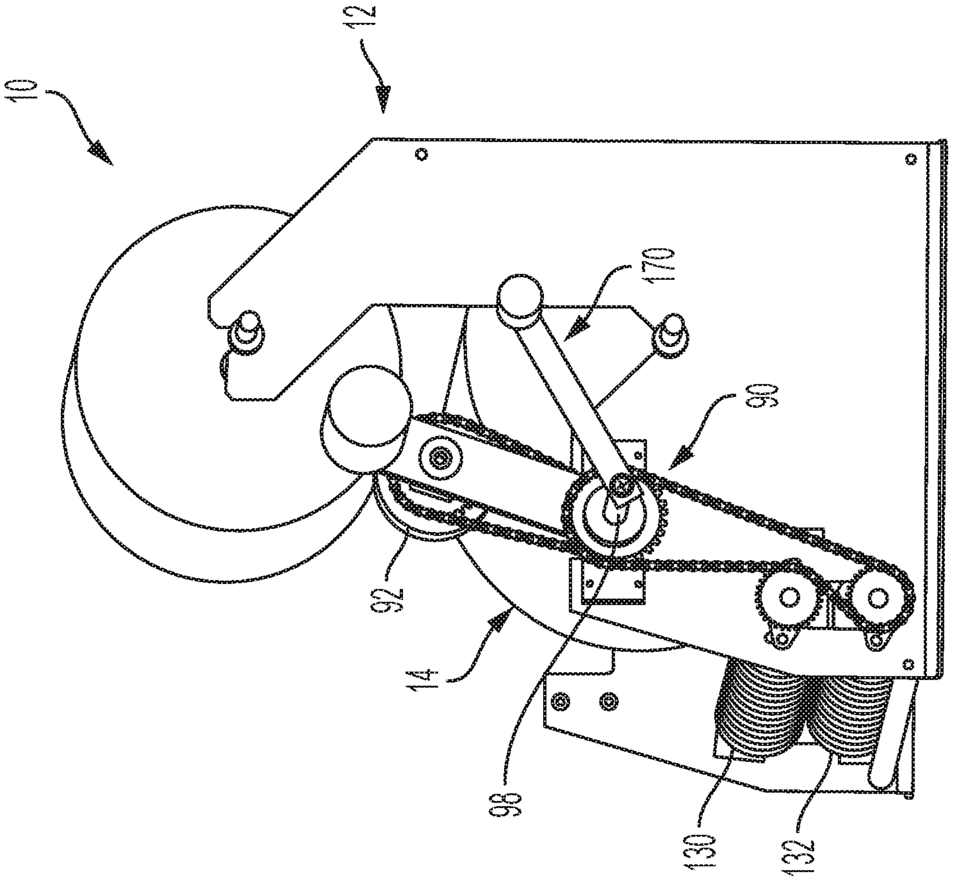
FIG. 9 is a side orthogonal view of the exemplary dunnage conversion system shown in FIG. 1, showing the drive assembly including a manual crank instead of the drive motor shown in FIG. 1.

Additionally or alternatively, a manual crank may be used in place of, or in addition to, a motive device to drive one or more of the drive member 92 and the expansion members 130, 132. For example, as depicted in FIG. 9, a manual crank 170 is coupled to the proximal end of the drive shaft 98 for driving rotation of the drive member 92, expansion members 130, 132, and supply 14.

In summary, the present invention provides a dunnage conversion assembly 10 that includes a supply 14 of expandable sheet material 16 and a dunnage conversion apparatus 12 configured to expand the expandable sheet material. The apparatus 12 includes a frame 60, a supply support 80 mounted to the frame 60 to support a supply 14 of sheet material 16, and first and second expansion members 130, 132 rotatably mounted to the frame 60 downstream of the supply support 80 to receive the sheet material 16 therebetween. At least one of the first expansion member 130 or the second expansion member 132 is rotatably driven. A drive assembly 90 of the apparatus 12 includes a drive member 92 and a motive device 104 that drives rotation of the drive member 92 to dispense the sheet material 16 from the supply 14. The drive member 92 is movable between an operating position adjacent the supply support 80 and a disengaged position spaced from the supply support 80, where the drive member 92 in the operating position is biased toward the supply support 80.

The present invention also provides a method of dispensing the expanded slit sheet material 16 using a dunnage conversion system 10 that includes the frame 60, the supply of expandable sheet material 14 supported on the supply support 80 coupled to the frame 60, the drive assembly 90 for dispensing the sheet material 16 from the supply 14, and the pair of opposed expansion members 130, 132 downstream of the supply support 80 for gripping the sheet material 16 passing between the expansion members 130, 132. The method includes the steps of: (a) driving the sheet material 16 with the drive assembly 90 and the first and second expansion members 130, 132 in a feed direction 36 from the supply support 80 to the first and second expansion members 130, 132; (b) expanding the expandable sheet material 16 via tension between a dispensing force applied to the sheet material 16 by the drive assembly 90 and a gripping force applied to the sheet material 16 by the first and second expansion members 130, 132; (c) selectively engaging the supply 14 of sheet material 16 with the drive assembly 90 such that engagement of the drive assembly 90 with the supply 14 of sheet material 16 allows for dispensing of the sheet material 16 from the supply 14, and disengagement of the drive assembly 90 from the supply 14 of sheet material 16 allows for removal of the supply support 80 from the frame 60; and (d) biasing the drive assembly 90 toward the supply support 80 when the drive assembly 90 and the supply 14 of sheet material 16 are in engagement.

Finally, turning back to FIG. 5, the dunnage conversion system 10 also may include a separator supply 162 of separator sheet material 160 in combination with the apparatus 12 and the supply 14 of expandable sheet material 16. The separator sheet material 160 may be used as a separator sheet between the resultant expanded dunnage product 18 and a product to be protected by the expanded dunnage product 18. An exemplary separator sheet material 160, also herein referred to as interleaf material, may be a tissue paper, thin kraft paper such as thinner or a lighter basis weight than the slit sheet material 16, plastic, or a combination thereof. The separator sheet material 160 generally is not slit.

The supply 162 of the separator sheet material 160 generally may be provided in one or more rolls. The illustrated dunnage conversion apparatus 12 is configured to support and to dispense the one or more rolls. The depicted separator sheet material 160 in each roll is wound about a hollow core that may be received on a respective separator supply support 166 of the dunnage conversion apparatus 12. The illustrated separator supply support 166 serves as an axle. The hollow core may rotate about the separator supply support 166 or with the separator supply support 166 as the separator sheet material 160 is unwound off the roll. The hollow core may be omitted in some embodiments.

The separator supply support 166 is received in opposing notches 170 defined by the opposing lateral sides 70. Alignment collars 172 are disposed on the separator supply support 166 to aid in lateral alignment of the separator supply 160 along the separator supply support 166 and also of the separator supply 160 between the lateral sides 70.

As depicted, the separator supply support 166 is disposed vertically above and horizontally upstream of the supply support 80. Though in other embodiments, the separator supply support 166 may be disposed vertically even with or vertically below the supply support 80. Additionally or alternatively, in some embodiments, the separator supply support 166 may be disposed horizontally even with or horizontally spaced downstream of the supply support 80.

To dispense the separator sheet material 160 from the separator supply 162, the separator sheet material 160 may be guided behind and under the supply 14, over the bottom portion 74, and through the expansion members 130, 132 of the guiding means 68. Rotation of the expansion members 130, 132 thus may drive joint dispensing of the expanded dunnage product 18 and separator sheet 160.

Although the invention has been shown and described with respect to a certain illustrated embodiment or embodiments, equivalent alterations and modifications will occur to others skilled in the art upon reading and understanding the specification and the annexed drawings. In particular regard to the various functions performed by the above described integers (components, assemblies, devices, compositions, etc.), the terms (including a reference to a "means") used to describe such integers are intended to correspond, unless otherwise indicated, to any integer which performs the specified function (i.e., that is functionally equivalent), even though not structurally equivalent to the disclosed structure which performs the function in the herein illustrated embodiment or embodiments of the invention.

The invention claimed is:

1. A dunnage conversion apparatus, comprising:
a frame;
a supply support mounted to the frame, wherein the supply support is configured to support a roll of sheet material;
a pair of expansion members including an upper, first expansion member and a lower, second expansion member, rotatably mounted to the frame downstream of the supply support to receive the sheet material therebetween and for rotation about respective first and second expansion axes, where at least one of the first expansion member or the second expansion member is driven for rotation about the respective expansion axis; and
a drive assembly including a drive member and a motive device that drives rotation of the drive member about a drive member axis to rotate the roll of sheet material to dispense the sheet material from the roll of sheet material, where the drive member is movable between an operating position adjacent the supply support and a disengaged position spaced from the supply support, and where the drive member in the operating position is biased toward the supply support.

2. The dunnage conversion apparatus of claim 1, where the drive assembly is configured such that drive member in the operating position is biased toward the supply support by gravity.

3. The dunnage conversion apparatus of claim 1, where the drive assembly includes a handle for manually moving the drive member between the operating position and the disengaged position, and where the handle is weighted such that gravity acting on the handle biases the drive member toward the supply support.

4. The dunnage conversion apparatus of claim 1, where the drive member is pivotable between the operating position and the disengaged position.

5. The dunnage conversion apparatus of claim 1, where the at least one of the first expansion member or the second expansion member is driven at a faster speed than the drive member.

6. The dunnage conversion apparatus of claim 1, where the first expansion member and the second expansion member are both driven at the same speed and in opposite rotational directions about their respective first and second expansion axes.

7. The dunnage conversion apparatus of claim 1, where the first and second expansion axes and the drive member axis are aligned parallel to one another when the drive member is in the operating position.

8. The dunnage conversion apparatus of claim 1, where the motive device drives both of the drive member and the at least one of the first expansion member or the second expansion member.

9. The dunnage conversion apparatus of claim 1, where the first and second expansion members each include a plurality of recessed portions and outward portions alternatingly distributed along the respective first and second expansion axes between opposite axial ends of the first and second expansion members.

10. The dunnage conversion apparatus of claim 1, in combination with a roll of sheet material including a sheet material having a plurality of slits configured to expand under tension applied in a feed direction from the supply support to the first and second expansion members.

11. The dunnage conversion apparatus of claim 10, where the roll of sheet material in combination with the dunnage conversion apparatus includes the plurality of slits arranged in a plurality of transversely-extending, longitudinally-spaced rows.

12. The dunnage conversion apparatus of claim 10, further including a second supply support and a supply of separator sheet material, wherein the supply of separator sheet material is supported by the second supply support.

13. The dunnage conversion apparatus of claim 1, where the supply support is removable from the frame when the drive member is in the disengaged position and the drive member in the operating position inhibits removal of the supply support.

14. The dunnage conversion apparatus of claim 1, where the drive member in the operating position is positioned to engage an axial end of the roll of sheet material.

15. A dunnage conversion apparatus, comprising:

a frame;

a supply support mounted to the frame for supporting a supply of sheet material that includes a roll of sheet material;

a pair of expansion members including an upper, first expansion member and a lower, second expansion member, rotatably mounted to the frame downstream of the supply support to receive the sheet material therebetween and for rotation about respective first and second expansion axes; and a drive assembly including one or more motive devices, the drive assembly configured to concurrently drive rotation of the roll of sheet material about a longitudinal supply axis of the supply support and to drive rotation of both of the first and second expansion members about the respective first and second expansion axes, where the drive assembly includes a drive member driven about a drive member axis by the one or more motive devices, where the drive member is movable between an operating position adjacent the supply support to drive rotation of the roll of sheet material and a disengaged position spaced from the supply support, and where the drive member in the operating position is configured to inhibit removal of the supply support relative to the frame.

16. The dunnage conversion apparatus of claim 15, where the drive member in the operating position is biased toward the supply support.

* * * * *